United States Patent [19]

Sugahara

[11] 4,093,239
[45] June 6, 1978

[54] PISTON ROD SEALING ARRANGEMENT FOR A STIRLING ENGINE

[75] Inventor: Eisuke Sugahara, Tokyo, Japan

[73] Assignee: Nippon Piston Ring Co., Ltd., Tokyo, Japan

[21] Appl. No.: 759,701

[22] Filed: Jan. 17, 1977

[30] Foreign Application Priority Data

Jan. 21, 1976 Japan .................................. 51-5681
Jan. 21, 1976 Japan .................................. 51-5682

[51] Int. Cl.² .......................... F02G 1/00; F16J 15/40
[52] U.S. Cl. .................................... 277/3; 277/15;
277/28; 277/59; 277/72 R; 277/149; 60/517; 92/168
[58] Field of Search .................. 277/3, 15, 17, 19, 20, 277/27, 28, 58, 59, 70, 71, 72 R, 72 FM, 75, 79, 135, 102, 149, 157, 163, 164, 192, 193; 60/517; 92/165 R, 168

[56] References Cited

U.S. PATENT DOCUMENTS

| 757,297 | 4/1904 | Goosmann | 277/3 |
| 791,300 | 5/1905 | Smith | 277/59 |
| 849,115 | 4/1907 | France | 277/3 |
| 895,791 | 8/1908 | Rollins | 277/157 X |
| 2,465,633 | 3/1949 | Cartier | 277/3 |
| 3,271,037 | 9/1966 | Hammond | 277/27 |
| 3,403,915 | 10/1968 | Roberts | 277/3 |
| 3,568,436 | 3/1971 | Heffner et al. | 60/517 |
| 3,832,935 | 9/1974 | Syassen | 92/168 X |
| 3,848,877 | 11/1974 | Bengtsson et al. | 60/517 X |
| 3,907,307 | 9/1975 | Maurer et al. | 277/71 X |

FOREIGN PATENT DOCUMENTS

| 28,252 | 3/1931 | Australia | 277/27 |
| 732,417 | 4/1966 | Canada | 277/59 |
| 388,711 | 6/1965 | Switzerland | 277/59 |
| 905,650 | 9/1962 | United Kingdom | 277/15 |
| 135,768 | 12/1919 | United Kingdom | 277/79 |
| 1,071,612 | 6/1967 | United Kingdom | 277/59 |

*Primary Examiner*—Robert S. Ward, Jr.
*Attorney, Agent, or Firm*—Sughrue, Rothwell, Mion, Zinn and Macpeak

[57] ABSTRACT

A sealing arrangement for the light working gases of a Stirling engine comprises, surrounding the piston rod below the cylinder chamber, a block seal portion and a liquid seal portion, the latter including an oil scraping middle unit, a liquid chamber, and a liquid seal portion. Any gases passing through the block seal portion are positively blocked by the liquid seal portion. Leakage gases are also drawn off from the block seal portion, compressed, and returned to the cylinder chamber through a time controlled valve during the low periods of the pressure cycle below the piston.

2 Claims, 4 Drawing Figures

PISTON ROD SEALING ARRANGEMENT FOR A STIRLING ENGINE

BACKGROUND OF THE INVENTION

This invention relates to a sealing arrangement for the axially reciprocable piston rod of a Stirling engine.

Stirling engines have received increasing attention in recent years owing to their high torque characteristics, clean exhaust gas, low noise, low fuel expense, low maintenace, and high durability as compared with a conventional gasoline engine. Furthermore, the thermal characteristics of a Stirling engine are equal or superior to those of an internal combustion engine, because in a Stirling engine hydrogen or helium is used as the working fluid instead of air, whereby the temperature characteristics of thermal heat exchangers are greatly improved.

However, since the hydrogen or helium working fluid has relatively small molecules, it is difficult to properly seal a Stirling engine. Stirling engines have exhibited high leakage in the sealing area between the cylinder wall and the piston rod. Conventional "rollsox" seals are reasonably effective, but their durability and temperature resistance is low due to the materials used therein.

SUMMARY OF THE INVENTION

Therefore, it is a object of the present invention to provide a tight, durable, sliding seal arrangement for the piston rod of a Stirling engine. The sealing structure of the invention is separated into two main portions; a block seal portion, and a liquid seal portion. The pressure of the working fluid is first reduced in the block seal portion, and thereafter it is effectively sealed in the liquid seal portion. When using only a sliding seal device, it is necessary to provide a relatively long piston rod in order to obtain a tight seal. In the present invention, on the other hand, the seal durability is greatly enhanced, and it is possible to use a short piston rod due to the two separate block and fluid seal portions. As the result, it is possible to reduce the overall size of the Stirling engine. The present invention also provides a recirculation system for the working fluid leaking out of the block seal portion. Such escaping working fluid is compressed in a single stage and returned to the cylinder chamber within a predetermined time. Thus, the invention provides a working fluid return structure in cooperation with the block seal portion in order to obtain a more complete seal. The return structure is inexpensive yet effective in returning the working fluid which leaks out of the cylinder chamber from the block seal portion back into the chamber. Therefore, the present seal arrangement can be used in a Stirling engine wherein relatively small molecules are present in the working fluid, and it is possible to provide an effective and economical return cycle using only a single compressor stage.

DETAILED DESCRIPTION OF THE PREFERRED EMBODIMENTS

Figure 1:
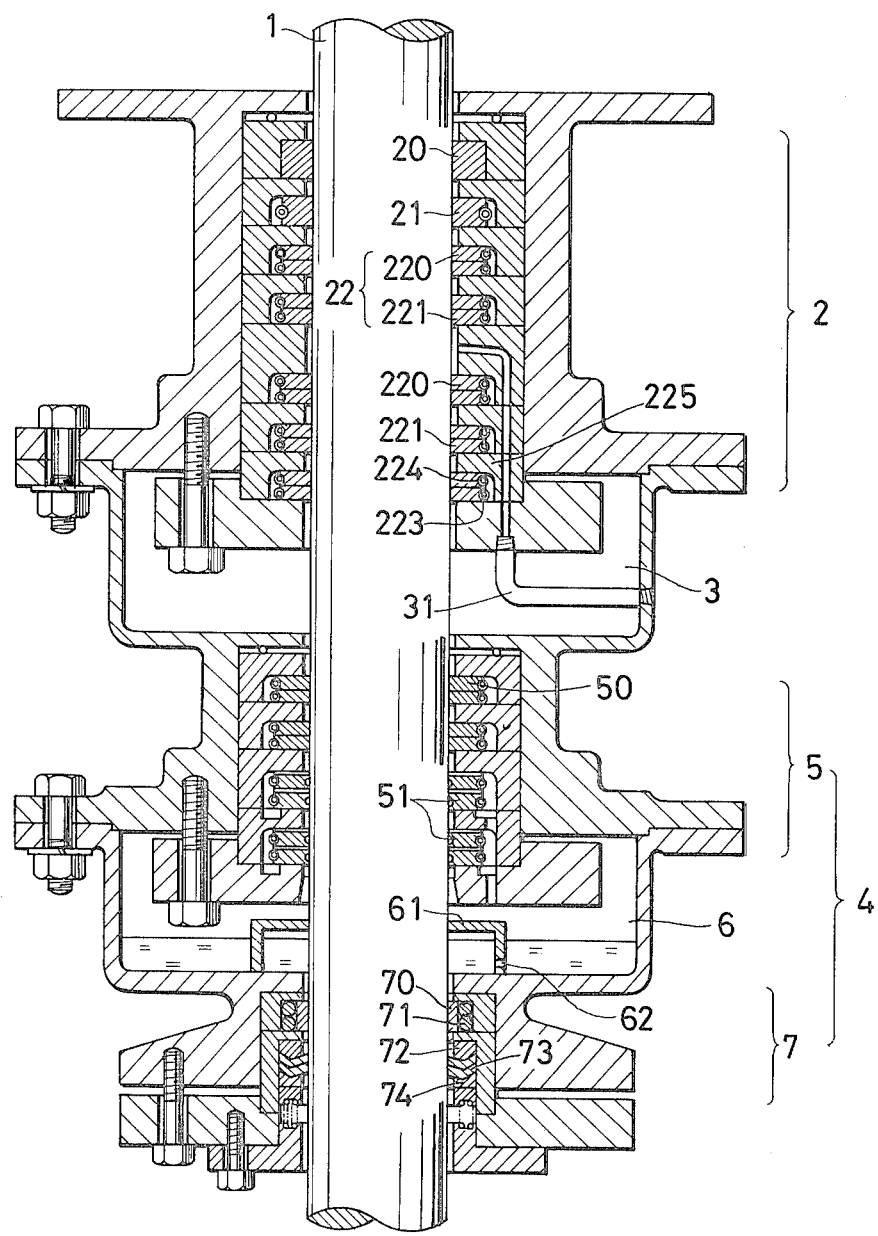
FIG. 1 shows a vertical sectional view of a preferred embodiment according to the present invention.

Referring now to the accompanying drawings, FIG. 1 shows the area below a cylinder chamber of a displacement type Stirling engine, for example, including a vertically downwardly depending piston rod 1 of the engine. A first block seal portion 2 comprises a bush 20, a breaker ring 21, and groups of seal blocks 22 around the periphery of the piston rod 1. The breaker ring 21 is substantially unlubricated, and prevents the advance leakage of working fluid together with the bush 20. The bush ring and breaker ring pair also reduces the load pressure on the block seal portion.

Figure 2:
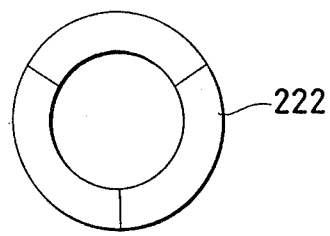
FIG. 2 shows a plan view of a packing ring used in the block seal portion of FIG. 1.

The seal blocks 22 each comprise a rod packing ring 220 and a back-up ring 221. The rod packing ring 220 sealingly contacts the piston rod 1. The back-up ring 221 contacts the rod packing ring 220, and serves as a protector in case the adjacent rod packing ring 220 becomes worn out and collapses. Each rod packing ring 220, as shown in FIG. 2, has several radial slits whereby the ring segments are urged against the piston rod 1 by a coil spring ring 224 disposed in an annular groove 223 around the outer periphery of the ring, whereby the working fluid is prevented from leaking in the axial direction of the piston rod 1 and, at the same time, the piston rod reciprocates smoothly due to the combination of the coil spring rings and the split segments of the rod packing rings 220.

The number, composition, configuration, etc. of the seal blocks 22 are properly selectable with respect to the type, temperature, pressure, and the like of the working fluid. In FIG. 1 five seal blocks 22 are shown. However, it is possible to arrange any number of seal blocks 22 in any desired order by means of the separating partitions 225.

Hydrogen, helium, and the like which leak through the block seal portion reach the liquid seal portion 4. However, it is desirable to provide an enlarged pressure reducing chamber 3 therebetween to control the leakage between the cylinder chamber and the pressure reducing chamber, and to reduce the pressure of the leaking fluid. Thereafer, any leaking fluid encounters a gas seal of rod packings 50 in a middle unit or liquid blocking portion 5, which also includes oil scraper rings 51.

The oil scraper rings 51 contact the piston rod to block the escape of liquid from a liquid seal chamber 6, which is positioned just below the middle unit portion 5. The liquid in chamber 6 clings to and rises along with the piston rod when it moves upwardly.

Any working fluid leaking through the middle unit portion 5 enters the liquid seal chamber 6. A final liquid seal arrangement 7 is provided below the chamber 6, and includes a seal ring 70, an O-ring 71, an adaptor 72, a V-packing 73, and an adapter ring 74, although the disclosed order of these components is variable.

The working fluid which leaks through the block seal portion 12 and the middle unit portion 5 is finally and completely sealed by the liquid seal chamber 6. The liquid used in this chamber must have a low affinity for the piston rod material, a high viscosity, and a large surface tension, such as mercury or oil.

In operation, when the engine is driven the piston rod begins to reciprocate. When the rod moves downward, the pressure in the cylinder chamber below or beneath the piston increases, and the working fluid begins to leak. The first stage of leakage resistance is provided by the seal blocks 22, which greatly reduce the pressure of the leaking working fluid in the lower end of the block seal portion 2. Any reduced pressure working fluid escaping past the chamber 3 is completely sealed by the liquid seal portion 4 constituted by the middle unit portion 5, the liquid seal chamber 6, and the liquid seal arrangement 7. The portion of the piston rod carrying liquid from chamber 6 is scraped by the oil scraper ring 51, having a surface portion in contact with the piston rod, when the rod moves upwardly. With such a ring arrangement, the upward diffusion of the liquid is effectively prevented. If the engine is installed in a ship, whereby the liquid seal chamber may be vibrated or slanted as the ship rolls, it is desirable to provide a coaxial annular cup 61 around the center of the piston rod to prevent the outward spread of the liquid. Holes 62 are provided in the cup so that liquid can be supplied therethrough.

Figure 3:
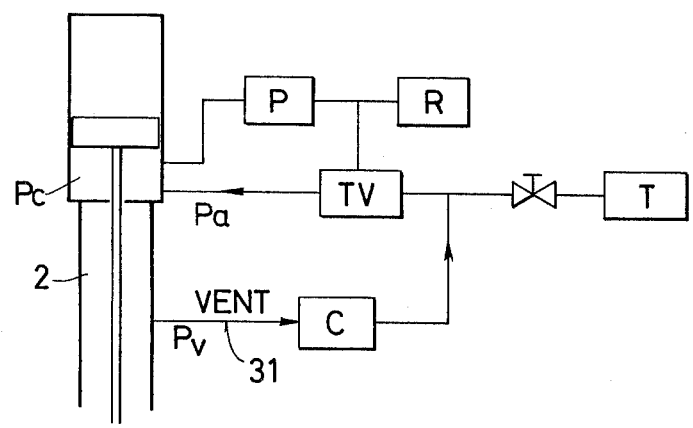
FIG. 3 shows a block diagram of the return structure for the leaking working fluid.

An important aspect of the invention is the return system whereby the leaking working fluid which strays into the various areas of the block seal portion 2 is returned to the cylinder chamber. The return system circuit is shown in FIG. 3. The leaking working fluid is introduced from the block seal portion through a return pipe 31 into a compressor C. The compressed working fluid under a return pressure Pa, which is increased by an amount α in the compressor, is returned into the cylinder chamber when a timing valve TV is opened. The return pressure Pa is represented as follows:

$$Pa = Pv + \alpha,$$

wherein, Pv is the leakage pressure, and

α is the pressure increase provided by the compressor. The timing valve $T_V$ is properly opened and closed under the control of a pressure detector P or a crank angle detector R.

Figure 4:
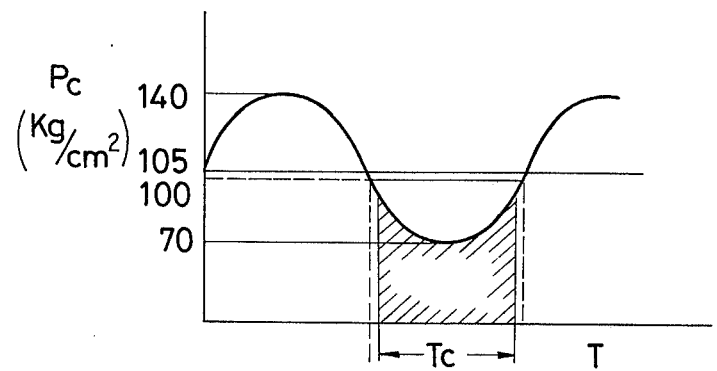
FIG. 4 shows a crank angle time-pressure diagram for the return of the working fluid.

It is possible to supply additional working fluid from a supplementing tank T in case the engine is driven for a long period of time. The return pipe 31 is connected intermediate the block seal groups and extended outwardly via the reducing chamber in FIG. 1. If the position at which the return pipe 31 is connected to the block seal groups is near to the cylinder chamber, it is advantageous that appropriate recirculation timing Tc (FIG. 4) be established with respect to the piston cycles, or the cylinder chamber pressure Pc. That is, whenever the return pressure Pa is higher than the cylinder chamber pressure Pc by a pressure or amount equal to or greater than α, the working fluid can be most effectively returned to the cylinder chamber.

If a high leakage pressure Pv is present, it is necessary to consider the capacity of the compressor, since a heavy compressor is too expensive and is undesirable for such a seal arrangement. Thus, it is desirable to locate or position the return pipe 31 as far as possible from the cylinder chamber. The optimum compressor conditions may be determined as follows:

(A) Generally, when the compression ratio ε is greater than 2, compression heat occurs and it is necessary to cool the compressor cylinders by water.

(B) If $\Delta P = Pa - Pv$ is too large, it is necessary to employ a multi-stage compressor. Considering criterion (A), an air cooled compressor is desirable, because of cost, wherein $\epsilon < 2$. Considering criterion (B), a single-stage compressor is desirable, again because of cost, and ΔP will thus be determined within the range of a single-stage compressor. For example, if the cylinder chamber pressure Pc and the leakage pressure Pv are 120Kg/cm$^2$ and 2kg/cm$^2$, respectively, then a multi-stage compressor is required, which is unduly expensive. Therefore, $\epsilon = 2$ is assumed to be the maximum compression ratio value for a single-stage, air cooled compressor, and it is also assumed that the compression process is adiabatic in nature.

Considering the above factors together, the pressure ratio Pv: Pa is determined as follows:

$$Pv \cdot Vv^K = Pa \cdot Va^K, \text{ and}$$

$$Pa/Pv = (Vv/Va)^K,$$

wherein, Vv is the volume before compression, and Va is the volume after compression. Now: ε is the compression ratio $Vv/Va = 2$, and K is an adiabatic index $= 1.4$. Therefore, $Pa/Pv = 2^{1.4} = 2.63$, and thus $Pv/Pa = 0.38$. Thus, if the return pressure Pa is 100kg/cm$^2$, the leakage pressure Pv is 38 kg/cm$^2$. The return pressure Pa to the cylinder chamber has to be higher than the cylinder chamber pressure Pc. Therefore, the leakage fluid can be returned to the cylinder whenever the cylinder chamber pressure Pc is below 100kg/cm$^2$, as shown in the hatched portion in FIG. 4.

It is a simple matter to control the working fluid recirculation about the mean pressure, since the cylinder chamber pressure curve is smoothly cyclic in nature. It is preferable to establish the return timing duration Tc within the range of mean pressure $<100$kg/cm$^2$, since the leakage is relatively small in this range and it is thus sufficient to use a small, single-stage, air cooled compressor. It is undesirable to limit the return timing to only extremely low cylinder chamber pressures, because the duration thereof is relatively short.

Although the present invention has been disclosed with respect to a Stirling engine, it is equally applicable to other engines faced with similar operating problems, as will be readily apparent to one skilled in the art.

What is claimed is:

1. A sealing arrangement for light molecular weight gases employed in a Stirling engine or the like, including a working cylinder, a reciprocating piston disposed in said cylinder, and an axially reciprocable piston rod secured to said piston and extending out of a cylinder opening, comprising:

(a) block seal means surrounding said piston rod immediately below said cylinder opening and including, in order, a bush, a breaker ring, at least one block seal packing ring, and at least one back-up ring, said block seal packing ring comprising a plurality of split ring segments inwardly biased by a coil spring disposed around the outer periphery thereof, (b) liquid seal means surrounding said piston rod below said block seal means and comprising, in order, a liquid blocking portion including at least one liquid seal packing ring and at least one scraper ring, a liquid reservoir, and a seal means for preventing the escape of the liquid in said reservoir, said liquid seal packing ring comprising a plurality of split ring segments inwardly biased by a coil spring disposed around the outer periphery thereof, said liquid seal means further including an annular cup coaxial with and surrounding said piston rod in said liquid seal reservoir to prevent the outward spread of the liquid, said coaxial annular cup having holes about its periphery to supply the liquid therethrough, (c) a leakage gas recirculation system including a return line coupled to said block seal means and drawing off gas leaking thereinto, (d) a compressor having an input coupled to said return line and a discharge output connected to said working cylinder below said piston through a control valve, and (e) opening means, including a crank angle timer, for opening said control valve when the cylinder pressure beneath said piston falls below a predetermined value.

2. A sealing arrangement as defined in claim 1, wherein the opening means further comprises a pressure sensing device.

* * * * *